May 13, 1930.  A. B. MOULTON  1,758,617
METHOD AND APPARATUS FOR COMBINING A PLURALITY OF SIGNALS
Filed Dec. 10, 1927   2 Sheets-Sheet 1

INVENTOR
A.B. MOULTON
BY *Ira J. Adams*
ATTORNEY

May 13, 1930. A. B. MOULTON 1,758,617
METHOD AND APPARATUS FOR COMBINING A PLURALITY OF SIGNALS
Filed Dec. 10, 1927  2 Sheets-Sheet 2
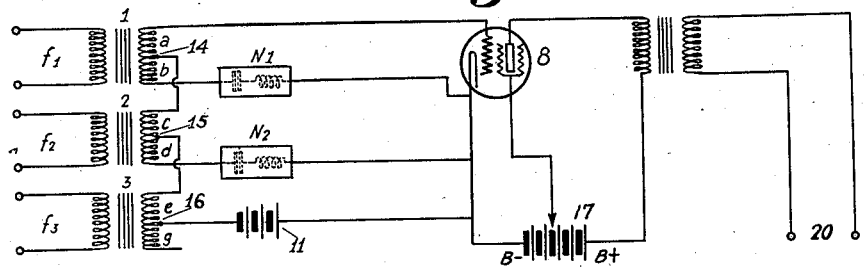
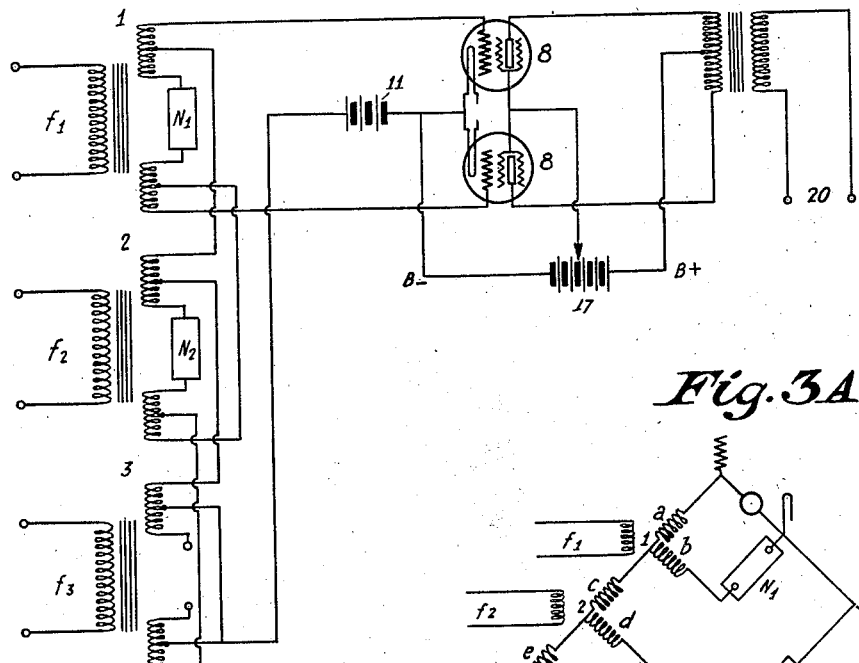
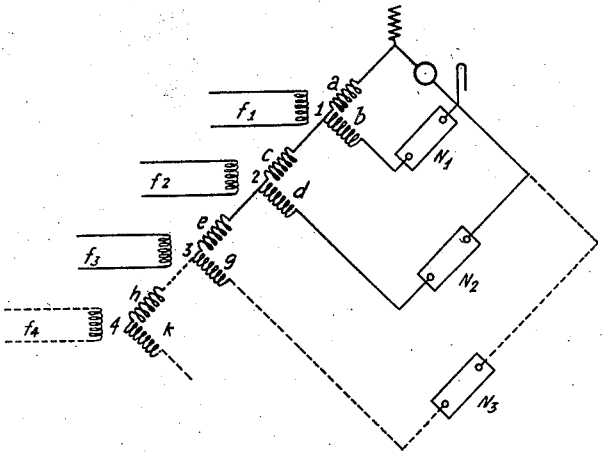
INVENTOR
A.B. MOULTON
BY
ATTORNEY Patented May 13, 1930

1,758,617

UNITED STATES PATENT OFFICE

ALBERT B. MOULTON, OF RIVERHEAD, NEW YORK, ASSIGNOR TO RADIO CORPORATION OF AMERICA, A CORPORATION OF DELAWARE

METHOD AND APPARATUS FOR COMBINING A PLURALITY OF SIGNALS

Application filed December 10, 1927. Serial No. 239,097.

This invention relates to apparatus for transmitting signals and particularly to apparatus for combining a plurality of signals to be transmitted by a single pair of wires.

In transmission of a plurality of signals by means of a single pair of wires, many disadvantages are encountered, such as reaction between units of apparatus and crosstalk between the several channels.

Broadly the principal object of this invention is to provide a novel but simple means that will combine and transmit a plurality of signals over a single pair of wires.

Another object of this invention is to provide a novel but simple amplifying relay that will combine and transmit a plurality of signals of different frequencies on a single pair of wires, without introducing interference between signals.

Another object of this invention is to provide an amplifying relay that will combine and transmit a plurality of signals of the same frequency and from different sources, on a single pair of wires without introducing crosstalk between channels.

Another object of this invention is to provide a novel but simple apparatus in which the several channels feeding the single pair of wires will be entirely independent of each other.

I attain these objects by the use of transformers which are electrically symmetrical with respect to the midpoint of their secondaries and a network of balancing inductances and capacities properly chosen and positioned in the circuits to form one arm of a bridge the other arms of which are made up of the adjacent halves of the divided secondaries and the load.

These objects are attained by the use of a push pull arrangement. In this case the balancing network may possibly have to consist of a 3 point impedance that is one which will give balance between the line and ground circuits simultaneously.

Other objects and advantages will become apparent from the following specification when read in connection with the attached drawings in which:

Figs. 3 and 4 show circuit diagrams of a combining device arranged and operated in accordance with my invention;

Fig. 3ª shows in detail the bridge arrangement used in Fig. 3; and

Figure 4 illustrates another embodiment of my invention in which two tubes connected in push-pull are shown.

Figure 1:
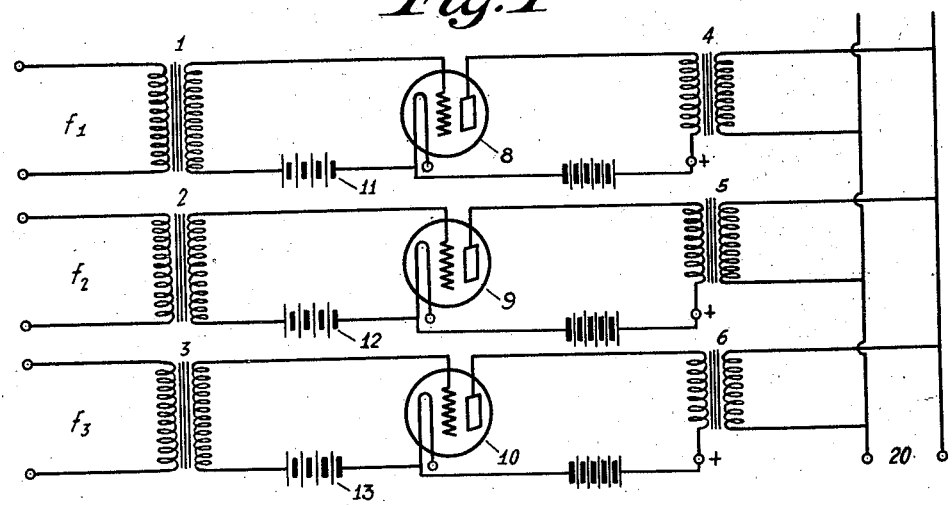
Fig. 1 shows the circuit diagram of apparatus generally used prior to my invention.

Referring to Fig. 1 the various frequencies $f^1$ and $f^2$ and $f^3$ to be combined and/or amplified are set up in the primaries of transformers 1, 2 and 3 respectively. The secondary windings of transformers 1, 2 and 3 are connected to the input elements of vacuum tubes 8, 9 and 10 respectively as shown. The grid elements of each of these tubes is maintained at the desired potential by biasing batteries 11, 12 and 13. The output elements of 8, 9 and 10 are connected to the primary windings of transformers 4, 5 and 6 respectively as shown. The secondaries of the last named transformers feed the signals into the line 20. By means of the single line 20 the signals are transmitted to the desired place.

The main disadvantage of this arrangement is that the signals from one channel react through the tubes due mainly to plate to grid capacity and mix with the signals in the other channels causing interference and crosstalk in the different channels. For instance signals at the frequency $f^3$ set up in the line L will react through the transformer 4 and appear with $f^1$ in the primary of transformer 1. Another disadvantage of this arrangement is that if the number of transformers is changed their combined impedance will be altered and will not match the line impedance.

One of the requirements to be met by apparatus of this nature is that the channels $f^1$, $f^2$ etc. be entirely independent; that is, none of the signals of frequency $f^1$ for instance can be tolerated in the circuit of frequency $f^2$.

Figure 2:
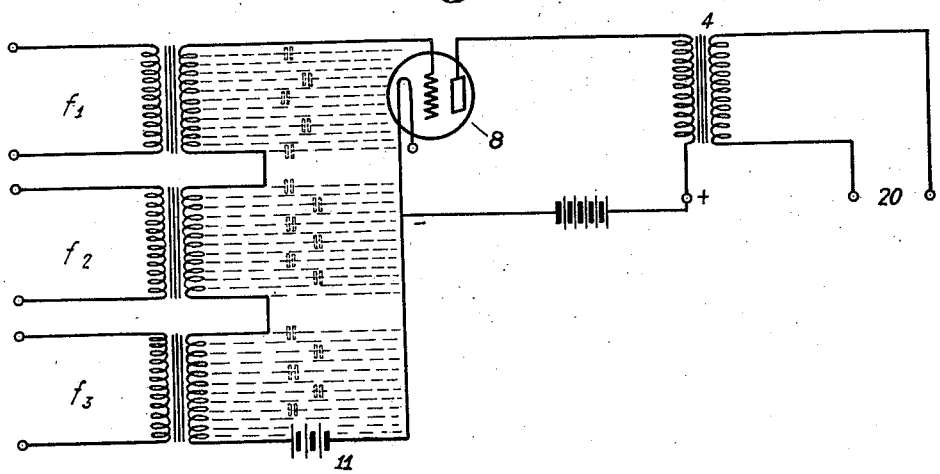
Fig. 2 shows a simplification of the apparatus shown in Fig. 1.

A means for overcoming the disadvantage mentioned with respect to the impedance of the transformers in matching the line impedance when their movement is changed is shown in Fig. 2 in which arrangement all of the secondaries of transformers 1, 2 and 3 are connected in series and the several signals are impressed on the input of a single vacuum tube 8. It will be seen from this figure that current from one of the signal channels say for instance $f^2$ in charging the various capacities shown by dotted lines in Fig. 2, must flow through all of the transformer secondary windings associated with these capacities and in so doing energy at frequency $f^2$ is caused to appear at $f^1$ and $f^3$ by transformer action. By similar reasoning, $f^1$ will appear in $f^2$ and $f^3$. It is the appearance of these different frequencies that causes crosstalk to a certain extend in the several branches.

The principal advantages of the apparatus shown in Fig. 2 over the prior known apparatus are that the number of tubes is reduced, the apparatus used is simple, and by the use of a single transformer connecting the apparatus to the output line 20 all of the disadvantages encountered in matching transformer impedance to line impedance when the number of channels is changed is done away with.

In Fig. 3 I have shown an improvement which overcomes all of the above mentioned disadvantages attendant upon apparatus as shown in Fig. 1.

In the modifications shown in Figs. 3 and 3a each of the transformers 1, 2 and 3 are electrically symmetrical that is the primary windings of each of the transformers 1, 2 and 3 are symmetrical with respect to the midpoints 14, 15 and 16 of their respective secondary windings. As seen from Figs. 3 and 3a the two halves $a$ and $b$ of the secondary winding of transformer 1 serve as the adjacent arms of a balanced bridge. The third arm is the load which is comprised of the grid and associated elements of the tube, and the fourth arm of this bridge is a balancing network as indicated by N in the drawings and is of such a value as to balance the load arm of the bridge. The balancing network for Fig. 3 is shown as an inductance and capacity in series, although it will be readily seen that it may include resistance, depending upon the degree of perfection of balance desired. Referring in particular to Fig. 3a of the drawings it will be seen that the two halves $a$ and $b$ of transformer 1 form the adjacent arms of a bridge the third arm of which is the load and the fourth arm of which is the balancing network $N^1$. The secondary of transformer 2 is arranged so that one part of its winding $c$ is connected to $a$ of transformer 1 forming one arm of a second bridge the other three arms of which are formed one by the above mentioned bridge, another by the balancing network $N^2$ and the last by the part $d$ of the secondary winding of transformer 2. It is evident that no neutralizing network will be required on the last transformer that is the transformer nearest the grid bias battery.

The apparatus of Fig. 3 is adapted to combine three frequencies as indicated by $f^1$, $f^2$ and $f^3$ and accordingly no network is required between the secondary of transformer 3 and the load. However if it is desired to combine more frequencies as for instance 4 the part $g$ of the secondary winding of transformer 3 is connected to the load through a bridge $N^3$ as indicated by dotted lines in Fig. 3a. In this case the biasing battery is connected to the midtap of the secondary of another transformer 4 which will need no balancing network.

Now assuming that the network necessary to give the required balance has been applied as shown at $N^1$ and $N^2$ of Fig. 3 currents set up in the transformer secondaries by any one of the several signals acting through its transformer will not react through the remaining transformers to produce voltage in the primary side of the remaining transformers and therefore will not cause crosstalk between the several branches. For instance currents caused in the secondary of transformer 1 by signals at $f^2$ are equal in both halves of said secondary and since the midpoint is at the center of a continuous symmetrically loaded winding do not produce voltage in the primary side of $f^1$. Likewise currents caused in the secondary of transformer 1 by signals at $f^3$ are equal in both sides of said secondary and do not produce voltage in the primary side of $f^1$. In like manner it can be shown that currents produced by signals at $f^3$ have no effect on the voltage of the primary of transformer 2. Also currents caused by signals at $f^1$ do not effect the voltage of the primaries of transformers 2 and 3. Thus by the use of applicant's novel arrangement of a bridge on a bridge a plurality of signals of like or unlike frequency can be combined without causing cross modulation therebetween.

The signals in the secondary windings of the several transformers are impressed on the input elements of a vacuum tube the output elements of which are connected with the primary winding of a transformer the secondary of which feeds the signals to a pair of wires 20, or other device.

In the combining device shown in Figure 3 for the purpose of eliminating all possibility of reaction between output circuits and input circuits due to capacity between elements of the tube and also to facilitate the balance of the bridge circuit, I have shown a tetrode in the third or load arm of the bridge, of that type in which the fourth electrode is adapted to completely shield the anode from the grid electrode or vice versa. However it will be understood that a triode of any known type may be used in the load arm of the bridge in place of the tetrode shown and any known method of neutralizing the capacity between the input and output elements thereof may or may not be used therewith depending on the degree of balance desired. In some cases as for instance where signals at low frequencies are combined, neutralization between the input and output elements of the tube is unnecessary, while in others where for instance high frequencies are to be combined it may be necessary to neutralize all capacity between the elements of the valve.

Referring again to Fig. 3 of the drawing the required potential is applied to the plate and shield electrode of the tetrode 8 by means of a common battery 17 as shown.

The main advantages of such a device arranged in accordance with Fig. 3 over devices for the same purpose known heretofore is that it is simple and economical in structure, uses but a single tube and entirely eliminates reactions or crosstalk between channels. The single output transformer when once matched to the line impedance or other device can be left in permanently and need not be changed if the number of channels is changed.

Fig. 4 is a further modification of the scheme shown in Fig. 3. In Fig. 4 I have shown an arrangement similar in structure and operation to the device shown in Fig. 3 except that in this case a pair of tubes in push pull arrangement are used in place of the single tube. In this case as in Fig. 3 the third arm of each bridge is the loaded side while the fourth arm is the balancing networks $N^1$ and $N^2$ similar to the network $N^1$ and $N^2$ of Fig. 3. As in Fig. 3 crosstalk and interference between the several channels is prevented by means of the balancing devices $N^1$ and $N^2$. The networks $N^1$ and $N^2$ in this figure as Figure 3 should be of a value to balance the bridge.

In this arrangement as in Fig. 3 it is evident that the balancing network will not be required on the transformer nearest the grid bias battery. In the form of the invention shown in Fig. 4 the network $N^1$ and $N^2$ may possibly have to consist of a 3 point impedance in which the balancing networks $N^1$ and $N^2$ should be arranged to balance the "line" capacity that is the capacity between the leads of the repeater transformers and also to simultaneously balance the capacity between the "line" and ground circuits.

The device shown in Figure 4 besides entirely eliminating all crosstalk and interference between channels has all of the advantages attendant on the use of a push pull arrangement, such as elimination of possibility of overloading of the tubes and the assurance that the device will always be in operation since if one tube gives out the remaining tube will still function although at reduced efficiency.

Throughout the drawings I have shown audio transformers; however, in cases where the signals to be combined are at radio frequencies, radio frequency transformers may be used in place of the audio frequency transformers and, it will be understood that the invention is adapted to combine radio frequencies of the same or different frequencies audio frequencies of the same or different frequencies or both.

While I have shown and described my combining bridge as having in one arm thereof a device of linear characteristics that is a device in one arm of the bridge which will combine a plurality of signals without cross modulation therebetween, it will be understood that the invention is broad enough to include the use of a combining device in the load arm of non linear characteristics, such as is used in heterodyne reception where a high frequency oscillator beats with an incoming signal.

In some cases as for instance where the device is used to combine signals at radio frequency or in heterodyning reception the secondaries of each of the several input transformers should be tuned by a variable capacity in parallel therewith. In this case it will be noted that each of these circuits can be tuned independently without altering the tuning of the other circuits.

Although for the sake of illustration I have fully disclosed the at present preferred form of my invention and the operation thereof I do not limit myself thereby except as marked out in the claims appended hereto.

I claim as my invention:

1. In radio apparatus means for combining a plurality of signals including a thermionic coupling tube the capacity between the input elements of which is common to one arm of a plurality of balanced bridges, a plurality of tapped windings each of which forms two adjacent arms of one of said balanced bridges, a balancing network in the fourth arm of each balanced bridge and means for impressing a plurality of signals on said input elements comprising an input winding symmetrically coupled to each of said tapped windings.

2. In combination a bridge circuit, means for impressing a frequency across a pair of conjugate neutral points of said bridge circuit, a second bridge circuit having three arms the fourth arm thereof comprising the first named bridge circuit, and means for impressing a second frequency across a pair of conjugate neutral points of said second bridge circuit.

3. In radio apparatus for combining a plurality of frequencies, a thermionic coupling tube, a transformer for each of the frequencies to be combined, a tapped secondary for each of said transformers, a balanced bridge circuit for each of said transformers, two adjacent arms of each of said balanced bridge circuits being composed of the tapped secondary windings of one of said transformers, the third arm of the first of said balanced bridge circuits being composed of the capacity between the input elements of said coupling tube, the third arm of each of the other of said balanced bridge circuits being composed of the preceding balanced bridge, and a balancing network in the fourth arm of each of the balanced bridges.

4. In combination, a plurality of transformers, having primary and secondary windings, a coupling tube having input elements and output elements, one end of the secondary of the first transformer being connected to one of said input elements the other end of said secondary winding being connected to the other one of said input elements through a balancing impedance, a connection between one end of the secondary of a second one of said transformers and the electrical center of the first transformer, a balancing impedance between the other end of said secondary and one of said input elements a connection from one end of the secondary of a third transformer to the electrical center of the secondary of the second transformer and a source of potential between the electrical center of the secondary winding of the third transformer and one of said elements.

5. Radio apparatus for combining a plurality of signals including a thermionic tube and an input circuit thereof consisting of a balanced bridge circuit in one arm of which the impedance of the input elements of the tube is included, a second balanced bridge circuit one arm of which includes the first named bridge, and means for setting up signals in each of said bridge circuits.

6. Radio signalling apparatus including a thermionic tube, input elements therefor, and means for impressing a plurality of signals on said input elements including, a balanced bridge circuit one arm of which includes the impedance between the said input elements, a second balanced bridge circuit one arm of which includes the first named bridge, and means including an inductance in each bridge for impressing signal voltages therein.

7. Radio apparatus including a thermionic tube and an input circuit therefor including, a balanced bridge circuit one arm of which includes the input elements of said tube, a second balanced bridge circuit one arm of which includes the first named bridge, a third balanced bridge circuit one arm of which includes the second named balanced bridge circuit, and means for impressing signal voltages in each of said bridge circuits.

8. Radio apparatus for impressing a plurality of signals on the input elements of a thermionic tube, an input circuit therefor including a series of balanced bridge circuits one arm of the first of which includes the impedance between the input elements of said tube, an arm of each of the following balanced bridge circuits including the preceding balanced bridge circuit, and means for setting up signals in each of said balanced bridge circuits.

9. In combination a bridge circuit, a second bridge circuit having three arms the fourth arm thereof including the first bridge circuit, a third bridge circuit having three arms the fourth arm thereof including the second bridge circuit, and means for impressing signal frequencies across a pair of conjugate neutral points of each of said bridge circuits.

A. B. MOULTON.